(12) United States Patent
Heirtzler, Jr. et al.

(10) Patent No.: US 10,549,617 B2
(45) Date of Patent: Feb. 4, 2020

(54) AUTOMATIC CONVERTIBLE TOP MECHANISM COVER

(71) Applicant: Ford Global Technologies, LLC, Dearborn, MI (US)

(72) Inventors: Paul L. Heirtzler, Jr., Northville, MI (US); Ron M. Lovasz, Allen Park, MI (US); Donald P. Iacovoni, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 72 days.

(21) Appl. No.: 15/912,525

(22) Filed: Mar. 5, 2018

(65) Prior Publication Data

US 2019/0270366 A1    Sep. 5, 2019

(51) Int. Cl.
*B60J 7/20* (2006.01)
*B60J 7/00* (2006.01)

(52) U.S. Cl.
CPC .............. *B60J 7/203* (2013.01); *B60J 7/0015* (2013.01)

(58) Field of Classification Search
CPC ........... B60J 7/0015; B60J 7/202; B60J 7/203
USPC ........................................ 296/136.05, 136.1
See application file for complete search history.

(56) References Cited

U.S. PATENT DOCUMENTS

| | | | |
|---|---|---|---|
| 6,318,792 B1 * | 11/2001 | Neubrand | B60J 7/202 296/107.08 |
| 6,508,502 B2 | 1/2003 | Willard | |
| 6,682,124 B1 * | 1/2004 | Bohnke | B60J 7/203 296/107.08 |
| 7,753,433 B2 | 7/2010 | Baumeier | |
| 8,579,354 B2 | 11/2013 | Cimatti | |
| 2018/0118009 A1 * | 5/2018 | Haimerl | B60J 7/203 |

FOREIGN PATENT DOCUMENTS

| | | |
|---|---|---|
| DE | 102006044036 B4 | 6/2008 |
| DE | 102008012684 A1 | 10/2009 |
| GB | 2506360 B | 2/2016 |

* cited by examiner

*Primary Examiner* — Jason S Daniels
(74) *Attorney, Agent, or Firm* — Vichit Chea; Carlson, Gaskey & Olds, P.C.

(57) ABSTRACT

A cover system for a convertible vehicle includes, among other things, a roller. A shade is stored on the roller. An actuator is attached to the shade and actuatable to pull the shade from the roller to an extended position over a portion of a convertible top mechanism of the vehicle. A method is also disclosed.

18 Claims, 5 Drawing Sheets

AUTOMATIC CONVERTIBLE TOP MECHANISM COVER

TECHNICAL FIELD

This disclosure relates to a cover portion for a convertible top mechanism of a motor vehicle that automatically actuates when the top is activated.

BACKGROUND

Vehicles with a convertible top necessarily include linkages and mechanism that are exposed when the top is lowered. The exposed linkages and mechanisms can disrupt aesthetic design features of the vehicle. Accordingly, covers are provided that can be assembled over the top and the exposed linkages. However, such covers typically require a vehicle operator to stop and exit the vehicle to retrieve and install the cover. Another means of covering the exposed linkages is to provide solid panels that are moved and folded over the exposed linkages. Such solid panels requires another set of relatively complex mechanisms that add weight complexity and require space for storage when the top is in the up position. Vehicle manufactures are continually seeking alternative methods and features to satisfy customer demands while minimizing costs and increasing manufacturability.

SUMMARY

A cover system for a convertible vehicle according to an exemplary aspect of the present disclosure includes, among other things, a roller. A shade is stored on the roller. An actuator is attached to the shade and actuatable to pull the shade from the roller to an extended position over a portion of a convertible top mechanism of the vehicle.

In a further non-limiting embodiment of the foregoing cover system, a biasing member biases the shade on the roller toward a retracted position.

In a further non-limiting embodiment of any of the foregoing cover systems, the actuator includes a cord attached to the shade on one end and to a rotatable cable drum on a second end.

In a further non-limiting embodiment of any of the foregoing cover systems, at least one guide defines a path for the cord during movement of the shade between the retracted and extended positions.

In a further non-limiting embodiment of any of the foregoing cover systems, a motor rotates the cable drum to pull the cord in a first direction to move the shade to the extended position.

In a further non-limiting embodiment of any of the foregoing cover systems, the shade includes a first shade stored on a first roller disposed on a first side of a convertible top and a second shade stored on a second roller disposed on a second side of the convertible top.

In a further non-limiting embodiment of any of the foregoing cover systems, the cable drum includes a first cable drum with a first cord attached to the first shade and a second cable drum with a second cord attached to the second shade.

In a further non-limiting embodiment of any of the foregoing cover systems, one motor drives both the first cable drum and the second cable drum.

In a further non-limiting embodiment of any of the foregoing cover systems, a first motor drives the first cable drum and a second motor drives the second cable drum.

In a further non-limiting embodiment of any of the foregoing cover systems, the cable drum includes a common cable drum that is attached to drive both the first cord and the second cord.

In a further non-limiting embodiment of any of the foregoing cover systems, the shade includes a flexible sheet material.

In a further non-limiting embodiment of any of the foregoing cover systems, the flexible sheet material includes one of a fabric, mesh and plastic sheet material.

In a further non-limiting embodiment of any of the foregoing cover systems, a controller generates commands to drive the actuator to pull the shade to the extended position responsive to receiving signals indicative of the convertible top mechanism being in a down position.

In a further non-limiting embodiment of any of the foregoing cover systems, the actuator drives a portion of the convertible top mechanism in addition to the shade.

In a further non-limiting embodiment of any of the foregoing cover systems wherein the actuator comprises a portion of the convertible top mechanism and the shade is coupled to the portion of the convertible top mechanism to automatically extend and retract with the convertible top mechanism.

A method of assembling a convertible top cover system according to an exemplary aspect of the present disclosure includes, among other things, mounting a shade to a roller proximate a portion of a convertible top mechanism. A cord is attached to the shade. The cord is attached to an actuator driven cable drum for pulling the shade from a retracted position where the shade is wrapped around the roller to an extended position covering the convertible top mechanism.

In a further non-limiting embodiment of the foregoing method, a controller is mounted for commanding the actuator to move the shade to the extended position responsive to signal indicating that the convertible top mechanism is in a down position.

In a further non-limiting embodiment of any of the foregoing methods, at least one guide is mounted to define a path of the cord to move the shade from the retracted to the extended position.

In a further non-limiting embodiment of any of the foregoing methods, a biasing member is mounted for pulling the shade to the retracted position wrapped around the roller.

The various features and advantages of this disclosure will become apparent to those skilled in the art from the following detailed description. The drawings that accompany the detailed description can be briefly described as follows.

DETAILED DESCRIPTION

Figure 1:
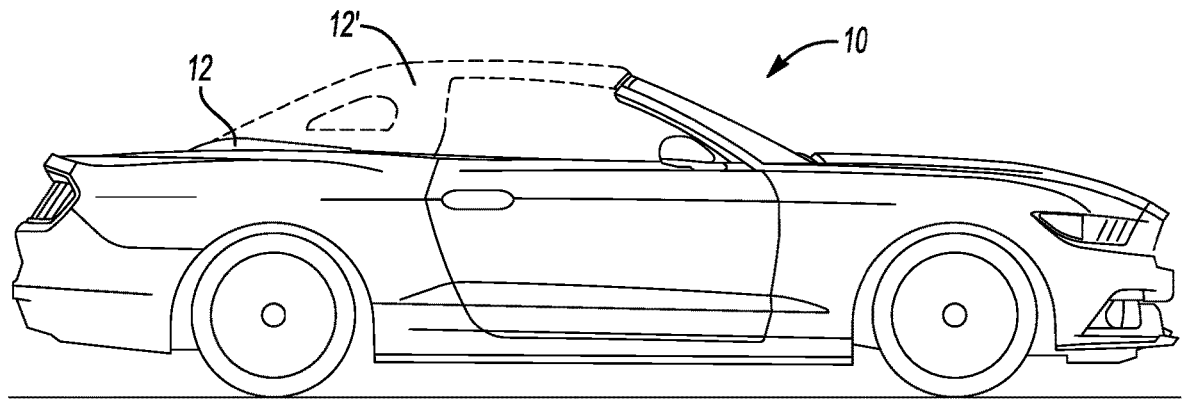
FIG. 1 is a schematic view of an example vehicle with a convertible top.
Figure 2:
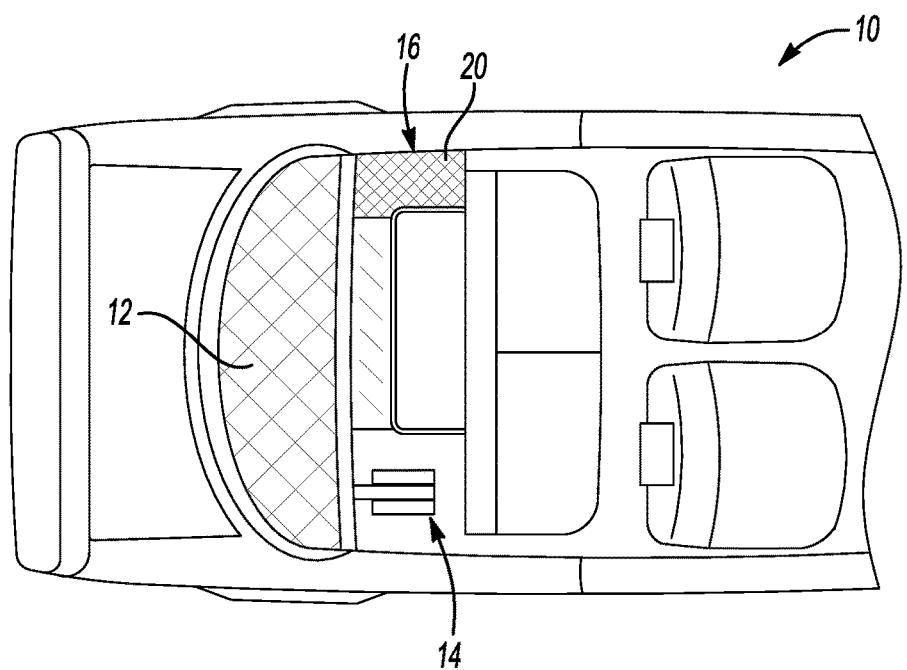
FIG. 2 is a top view of an example vehicle with a convertible in a down position.

Referring to FIGS. 1 and 2, a vehicle 10 includes a convertible top 12 that is movable from a retracted or down position and covered or up position. The convertible top 12 requires mechanisms schematically shown at 14 to raise and lower the top. In some instances, the mechanisms 14 can be visible once the top is in the down position. The visible convertible top mechanisms 14 are not aesthetically pleasing and are covered by a disclosed example automatic cover system 16. The example cover system 16 includes a shade 20 that is pulled over the exposed convertible top mechanisms 14 when the convertible top 12 is in the down position.

Figure 3:
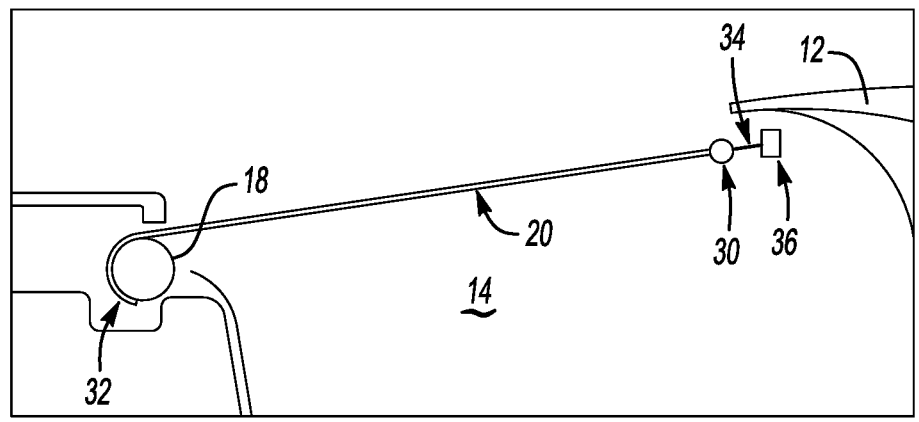
FIG. 3 is a schematic view of an example cover system.
Figure 4:
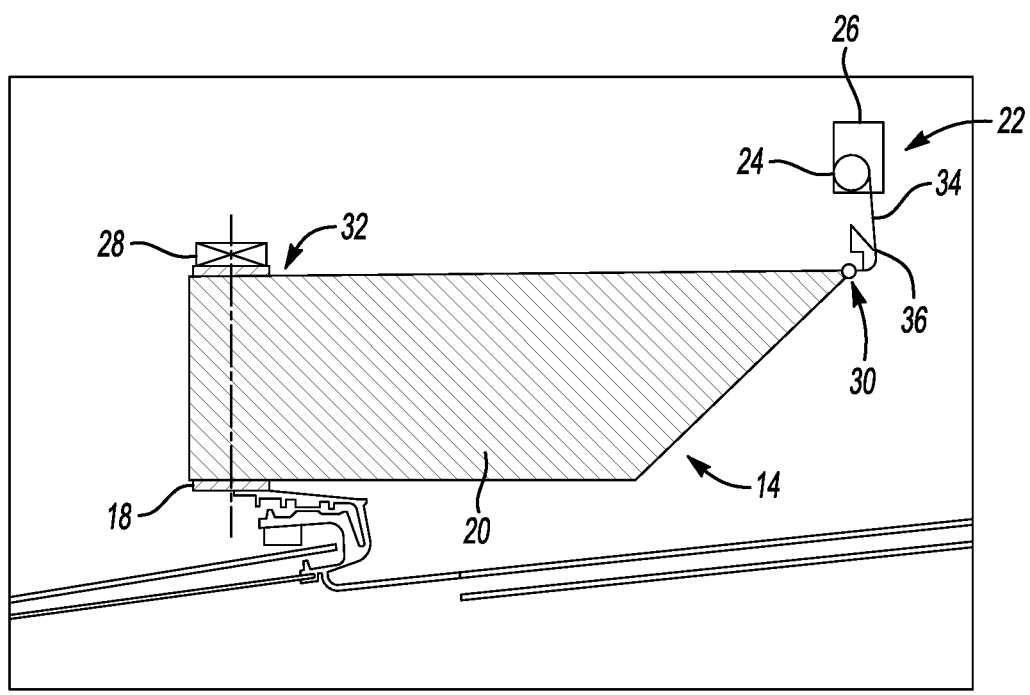
FIG. 4 is a top view of the example cover system in an extended position.

Referring to FIGS. 3 and 4, the example cover system 16 includes the shade 20 that is mounted to a roller 18. The roller 18 includes a spring 28 that biases the shade 20 towards a retracted position. The shade 20 is a fabric material and it wraps around the roller 18 when in in the retracted position.

FIGS. 3 and 4 illustrate the shade 20 in an extended position where it is pulled over a space containing the mechanisms 14. A cord 34 is attached to a first end 30 of the shade 20. A second end 32 of the shade 20 is wrapped around the roller 18 for storage when not in use. A guide 36 directs the cord 34 to a cable drum 24 that draws the cord 34 to pull the shade 20 to the extended position. In this example, the cable drum 24 is part of an actuator 22 that includes a motor 26. The motor 26 actuates the cable drum 24 to retract and release the cord 34 to move the shade 20 between a retracted position and an extended position as is illustrated in FIGS. 3 and 4.

Figure 5:
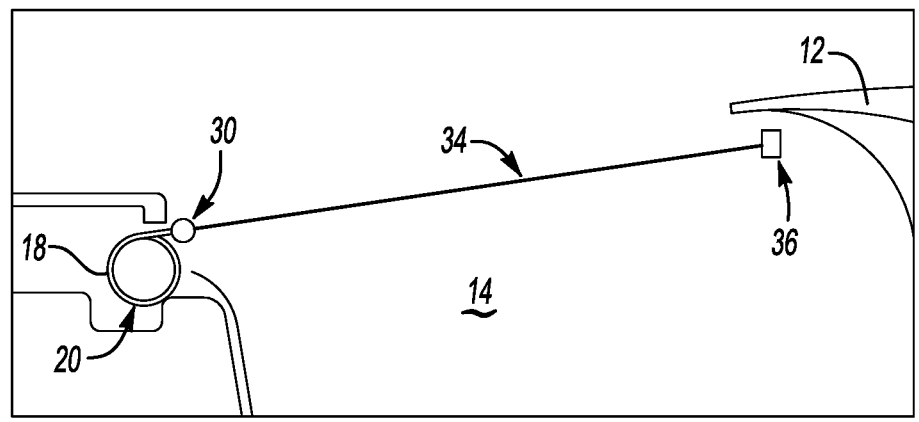
FIG. 5 is a schematic view of the cover system in a retracted position.
Figure 6:
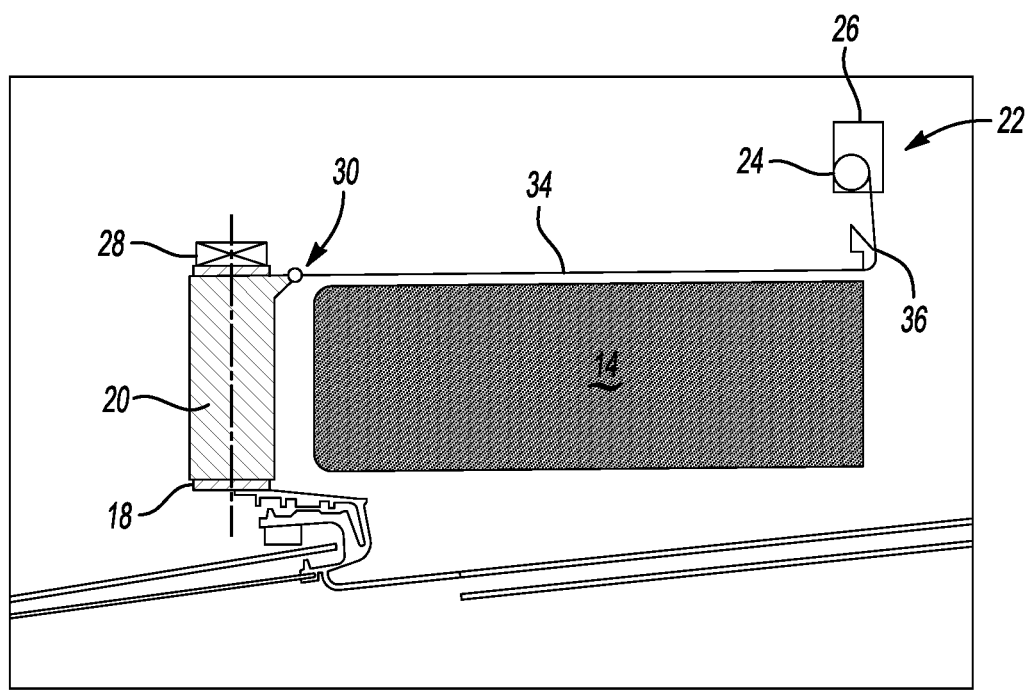
FIG. 6 is a top view of the example cover system in a retracted position.

Referring to FIGS. 5 and 6 with continued reference to FIGS. 3 and 4, the example cover system 16 is shown in a retracted position where the shade 20 is wrapped about the roller 18. The shade 20 wraps about the roller 18 when the cable drum 24 is actuated by the motor 22 to enable the shade to retract from the extended position. The roller 18 includes the biasing member 28 to maintain a tension on the shade 20 to provide a neat and tidy retraction of the shade 20.

The size of the shade 20 is determined to extend over the entire space taken up by the exposed top mechanism 14. The specific size and shape of the shade 20 will change depending on application specific requirements to cover the space of the exposed top mechanism.

The example shade 20 is a flexible material and may be made of any flexible sheet material that could be easily rolled onto the roller 18. In one example disclosed embodiment, the material is a fabric mesh. In another disclosed embodiment, the material 20 is a plastic sheet material. It should be appreciated that any sheet materials such as fabric mesh or others are within the contemplation of this disclosure and could be utilized for the example shade.

Figure 7:
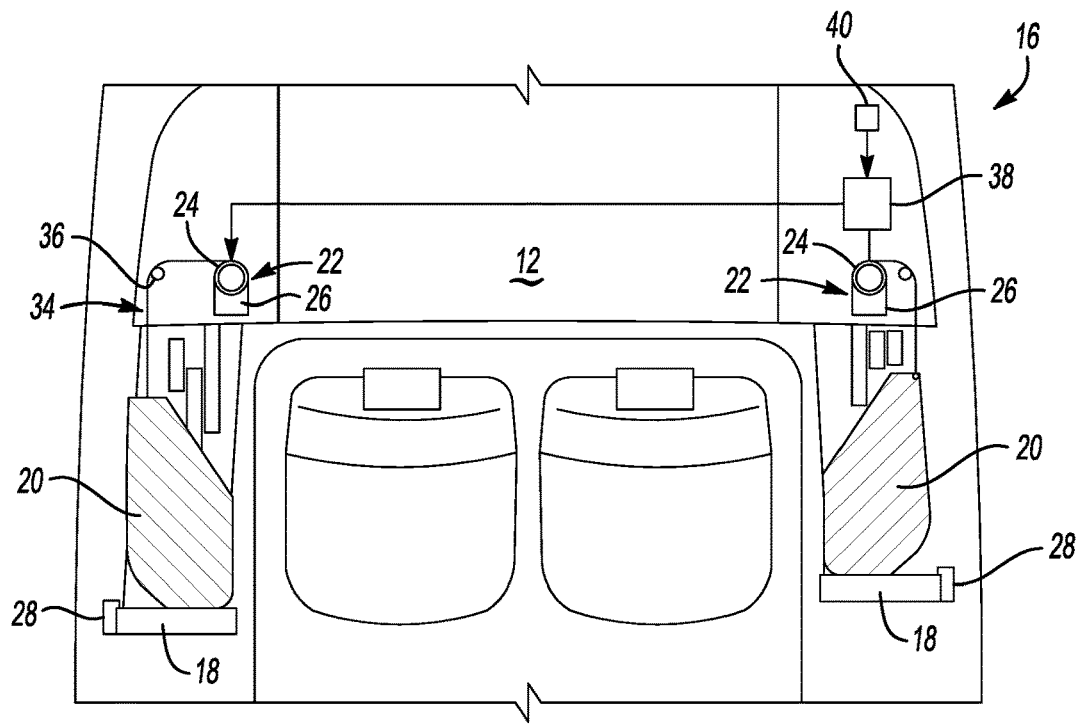
FIG. 7 is a schematic view of the example cover system embodiment.

Referring to FIG. 7, the example cover system 16 is shown in a schematic view and includes first and second shades 20 disposed on either side of the convertible top 12. As appreciated, each vehicle will have open linkages on either side of the convertible top 12 and thereby would include two shades 20. In this example, each shade 20 includes a cord 34 that is attached to an individual actuator 22. In this example, a first actuator 22 is disposed on one side of the vehicle and a second actuator 22 is disposed on another side of the vehicle. Each of the first and second actuators 22 include a separate drum 24 that draws separate cords 34 to actuate a corresponding shade 20 between the extended and retracted position.

The example cover system 16 includes a controller 38 that controls actuation of the motors 26 to rotate the cable drums 24 in response to an indication that the top 12 is in the down position. In one example, a sensor 40 is provided that provides an indication that the top 12 is in a down position. The example controller 38 may be an individual controller utilized just for the cover system 16 or may be part of a larger vehicle controller that controls various other features of the vehicle including the convertible top system.

Figure 8:
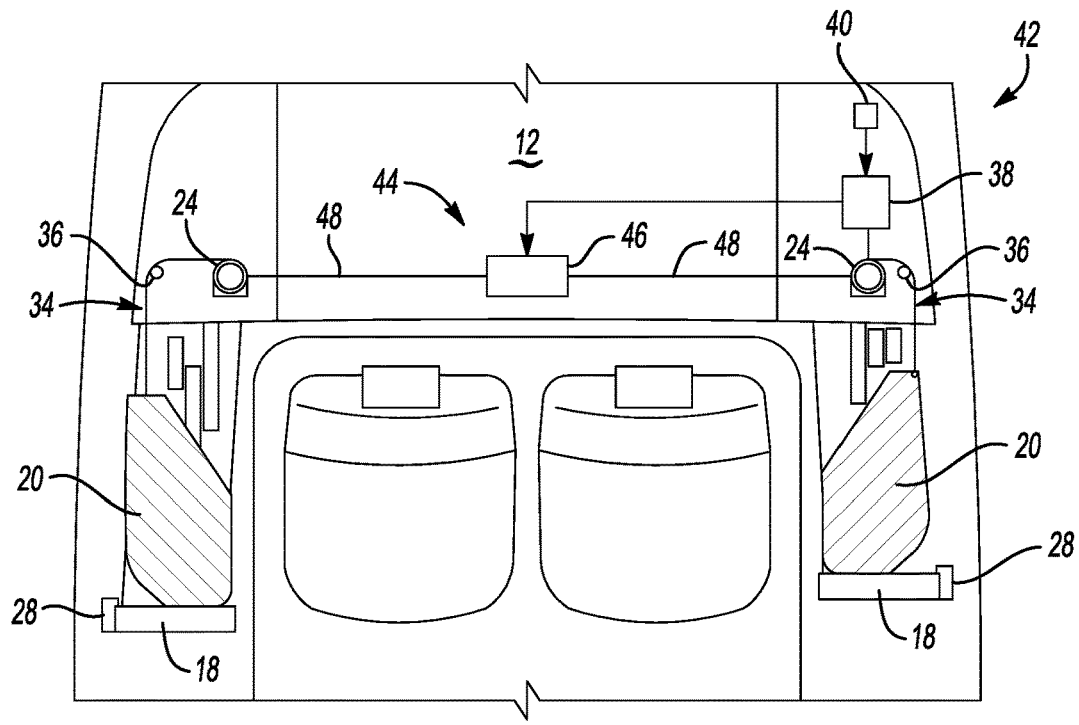
FIG. 8 is a schematic view of another example cover system embodiment.

Referring to FIG. 8, another example cover system embodiment 42 is illustrated and includes an actuator 44 with a single, central motor 46 that is attached to first and second drums 24 through mechanical linkages 48. The mechanical linkages 48 extend from the central motor 46 to drive both drums 24.

Figure 9:
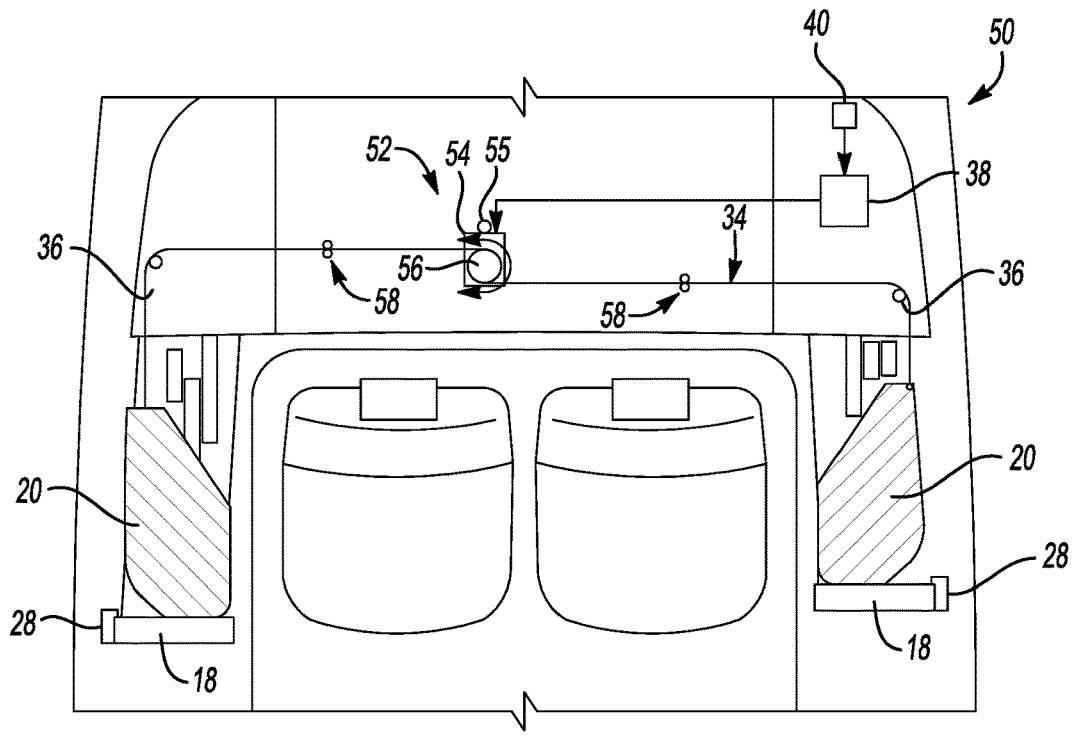
FIG. 9 is a schematic view of yet another example cover system embodiment.

Referring to FIG. 9, another example cover system embodiment is schematically shown at 50 and includes a central actuator 52 including one drum 56 that actuates both cords 34 for each of the shades 20 disposed on either side of the vehicle. In this example, the drum 56 is driven by a single motor 54 and the cords 34 are guided by a first guide 36 and a second guide 58 disposed further inboard of the vehicle. The actuator 52 may be a separate actuator utilized only for the cover system 50.

The actuator 52 illustrated in FIG. 9 may also be an actuator utilized for other purposes of the convertible. For example, an actuator utilized for driving a top down stack latch schematically shown at 55 that secures the convertible in the stowed position could be utilized to drive the central drum 56.

Figure 10:
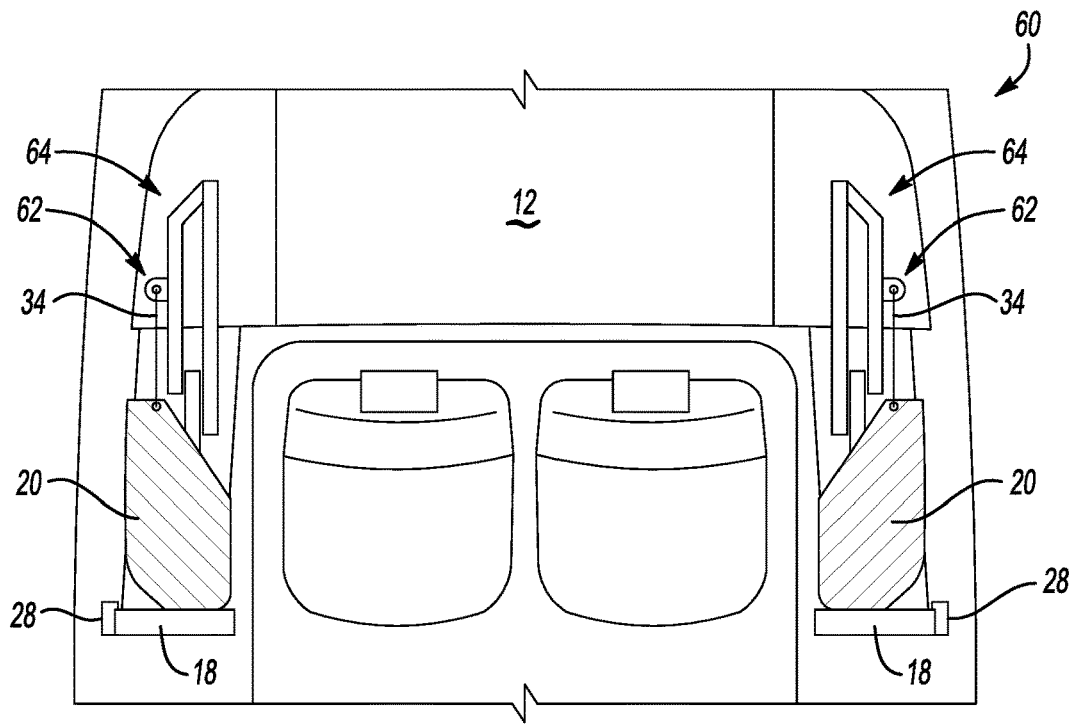
FIG. 10 is a schematic view of still another example cover system embodiment.

Referring to FIG. 10, another example cover system 60 does not include separate actuators, but instead is coupled to existing structures of the convertible top mechanism. The mechanism for moving the top 12 includes linkages schematically depicted at 64 to which the cord 34 may be attached. Note that in the example linkages 64 are schematically depicted and represent structures and linkages that move during movement of the top 12. Other shapes and positions of the convertible top mechanism could be utilized. In this example the linkage 64 include a movement that begins and ends with the top in the up or down positions. The attachment 62 is provided in a location that causes the shade 20 to move toward the extended position and complete that movement once the top is in the fully down position. Moreover, subsequent movement of the top position enables the shade 20 to automatically move toward the retracted position. The automatic cover system 60 provides the desired coverage utilizing existing linkages and movements.

Accordingly, the example cover system embodiments provide a simple automatic system for covering unsightly portions of the convertible top mechanism when the convertible is in a down position without expensive cumbersome additional mechanisms.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A cover system for a convertible vehicle comprising:
a roller;
a shade stored on the roller;
an actuator attached to the shade and actuatable to pull the shade from the roller to an extended position over a portion of a convertible top mechanism of the vehicle; and
a controller generating commands to drive the actuator to pull the shade to the extended position responsive to receiving signals indicative of the convertible top mechanism being in a down position.

2. The cover system as recited in claim 1, including a biasing member biasing the shade on the roller toward a retracted position.

3. The cover system as recited in claim 1, wherein the actuator comprises a cord attached to the shade on one end and to a rotatable cable drum on a second end.

4. The cover system as recited in claim 3, including at least one guide defining a path for the cord during movement of the shade between the retracted and extended positions.

5. The cover system as recited in claim 3, including a motor rotating the cable drum to pull the cord in a first direction to move the shade to the extended position.

6. The cover system as recited in claim 5, wherein the shade comprises a first shade stored on a first roller disposed on a first side of a convertible top and a second shade stored on a second roller disposed on a second side of the convertible top.

7. The cover system as recited in claim 6, wherein the cable drum comprises a first cable drum with a first cord attached to the first shade and a second cable drum with a second cord attached to the second shade.

8. The cover system as recited in claim 7, including one motor driving both the first cable drum and the second cable drum.

9. The cover system as recited in claim 7, including a first motor driving the first cable drum and a second motor driving the second cable drum.

10. The cover system as recited in claim 6, wherein the cable drum comprises a common cable drum that is attached to drive both the first cord and the second cord.

11. The cover system as recited in claim 1, wherein the shade comprises a flexible sheet material wrapped around the roller.

12. The cover system as recited in claim 11, wherein the flexible sheet material comprises one of a fabric, mesh and plastic sheet material.

13. The cover system as recited in claim 1, wherein the actuator drives a portion of the convertible top mechanism in addition to the shade.

14. The cover system as recited in claim 1, wherein the actuator comprises a portion of the convertible top mechanism and the shade is coupled to the portion of the convertible top mechanism to automatically extend and retract with the convertible top mechanism.

15. A method of assembling a convertible top cover system comprising:
mounting a shade to a roller proximate a portion of a convertible top mechanism;
attaching a cord to the shade; and
attaching the cord to an actuator driven cable drum for pulling the shade from a retracted position where the shade is wrapped around the roller to an extended position covering the convertible top mechanism.

16. The method as recited in claim 15, including mounting a controller for commanding the actuator to move the shade to the extended position responsive to signal indicating that the convertible top mechanism is in a down position.

17. The method as recited in claim 15, including mounting at least one guide to define a path of the cord to move the shade from the retracted to the extended position.

18. The method as recited in claim 15, including mounting a biasing member for pulling the shade to the retracted position wrapped around the roller.

* * * * *